(12) United States Patent
Foti

(10) Patent No.: US 8,990,873 B2
(45) Date of Patent: Mar. 24, 2015

(54) SYSTEM AND METHOD FOR OITF RECOVERY

(75) Inventor: George Foti, Dollard-des-Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 679 days.

(21) Appl. No.: 13/008,113

(22) Filed: Jan. 18, 2011

(65) Prior Publication Data

US 2011/0179461 A1    Jul. 21, 2011

Related U.S. Application Data

(60) Provisional application No. 61/295,909, filed on Jan. 18, 2010.

(51) Int. Cl.
| | |
|---|---|
| H04L 29/08 | (2006.01) |
| H04N 7/173 | (2011.01) |
| H04L 29/14 | (2006.01) |
| H04L 29/06 | (2006.01) |

(52) U.S. Cl.
CPC ............. *H04L 67/14* (2013.01); *H04L 65/1016* (2013.01); *H04L 65/104* (2013.01); *H04L 65/4069* (2013.01); *H04L 69/40* (2013.01); *H04L 67/142* (2013.01)
USPC ........................................................ 725/109

(58) Field of Classification Search
None
See application file for complete search history.

(56) References Cited

U.S. PATENT DOCUMENTS

| | | | |
|---|---|---|---|
| 2003/0040280 A1 | 2/2003 | Koskelainen | |
| 2006/0149847 A1 | 7/2006 | Meskauskas et al. | |
| 2007/0130346 A1 | 6/2007 | Xie et al. | |
| 2008/0098255 A1 | 4/2008 | Tagane | |
| 2008/0151918 A1* | 6/2008 | Foti | 370/410 |
| 2009/0031016 A1 | 1/2009 | Nakai | |
| 2009/0119699 A1* | 5/2009 | Crassous et al. | 725/25 |
| 2009/0222874 A1 | 9/2009 | White et al. | |
| 2010/0177767 A1 | 7/2010 | Ishii | |

FOREIGN PATENT DOCUMENTS

| | | | |
|---|---|---|---|
| EP | 2099156 A1 * | 9/2009 | H04L 29/14 |
| WO | 03/039186 A1 | 5/2003 | |

OTHER PUBLICATIONS

OIPF Open IPTV Forum, OIPF Release 1 Specification Profiles, Oct. 8, 2009, V1.0, p. 7.*
International Search Report from corresponding application PCT/IB2011/050222, Jun. 4, 2011.

* cited by examiner

*Primary Examiner* — Nathan Flynn
*Assistant Examiner* — Omar S Parra
(74) *Attorney, Agent, or Firm* — David J Rahmer; Ericsson Canada Inc.

(57) ABSTRACT

A system and method for failure recovery for a node in an IPTV network makes use of the ability of an IMS Gateway, an Open IPTV Terminal Function, and an IPTV Control Server to provide each other with information about a session to be recovered in a manner which allows the control session state to be reconstructed without impacting the user's viewing experience.

25 Claims, 3 Drawing Sheets

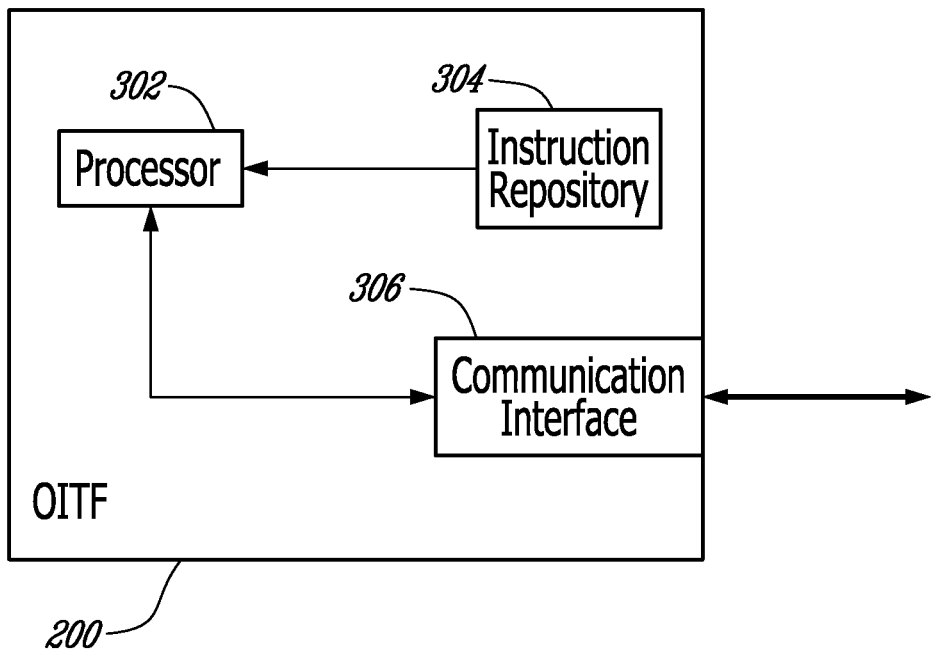
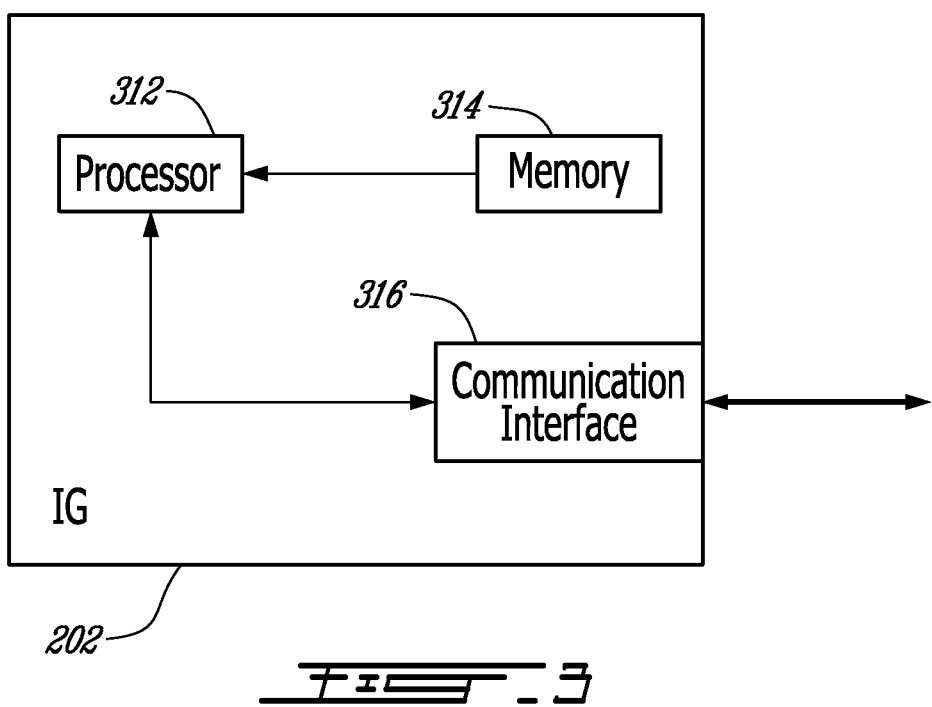

SYSTEM AND METHOD FOR OITF RECOVERY

RELATED APPLICATION

The present application is related to, and claims priority from, U.S. Provisional Patent Application No. 61/295,909, filed Jan. 18, 2010, entitled "System and Method For IPTV Terminating Node Recovery", the disclosure of which is incorporated herein by reference.

TECHNICAL FIELD

The present invention relates generally to procedures and mechanisms for node recovery.

BACKGROUND

In the past, television programming was originally broadcast to viewer's television sets through a radio wave transmission in a defined frequency band referred to as a channel, transmitted from a broadcast tower and received by antennas located at a home. As technology progressed, these broadcast signals were retransmitted over a common access cable infrastructure to the home.

As technology has provided new or improved delivery mechanisms, they have been employed to allow for improved or enhanced television experiences. With the arrival of packet based data networks, and the processing power to properly encode and decode video data at sufficiently high frame rates, Internet Protocol TV (IPTV) is becoming more accessible. IPTV employs a packed based delivery network where infrastructure elements are employed to verify that a given use is authorized to access content before the requested content is delivered to the user.

In packet based networks, broadcasting data is not typically done. Instead data is either sent to a specific node (unicast) or sent to a plurality of nodes (multicast). Many users can join a multicast session, and from the user perspective, this may not show any differences from a conventional broadcast.

In conventional IPTV environments, the network is built upon an Internet Multimedia Subsystem (IMS), an architectural framework which uses a plurality of Internet Protocols (IP) for delivering IP multimedia services to a user. The IMS network employs Session Initiation Protocol (SIP) as a control channel protocol. SIP commands are employed to provide control over the initiation and termination of sessions. The packets containing the actual video content are not delivered through the control session, but instead are delivered in the content delivery session using another protocol such as the Real-time Transport Protocol (RTP).

Reference is now made to FIG. 1a (prior art). In an exemplary IPTV network 100, one or more Open IPTV Terminal Function (OITF) devices, which are often provided in the form of Set Top Boxes (STB), are connected to an IP network via an IMS Gateway (IG) 104 and an access router (not shown). For simplicity, only one OITF device 102 is shown in this example.

It should be understood that an OITF 102, as with many other nodes in an IPTV network, is a device that performs a number of different functions and can be implemented in either dedicated hardware as is typically the case in an STB, or on a general purpose computer. Some components of the device are dedicated to decoding the audio and video data, leaving administration of the network functionality to other components of the device. This is often described by referring to the device as having a data plane and a control plane.

Typically a SIP session is used to create a control session, which in turn, is used to create a content delivery session between a Content Source 108 and an OITF. A SIP session 106a is established between OITF 102 and the IG 104, and an associated SIP session 106b is established between the IG 104 and the IPTV Control Server (IPTV CS) 110, which is used to invoke and tear down RTP sessions, as well to perform other session-related management functions. An RTP session 112 is established between the OITF 102 and the Content Source 108. Note that the IG 104 is acting as a Back to Back User Agent (B2BUA) between the two associated control sessions 106a and 106b that form a single virtual session. Those skilled in the art will appreciate that for the sake of brevity this may be referred to simply as a control session. Alternatively, an HTTP session may be established between the OITF 102 and the IG 104, in lieu of the SIP session 106b. In this case, the IG 104 would still use a SIP session with the IPTV CS 110 and handle all the necessary inter-working between the associated HTTP and SIP control sessions.

At present, there is no mechanism supported by an open standard group in the IPTV space, such as the Open IPTV Forum, that provides for a graceful recovery procedure to allow a node to recover from a failure. An OITF or an IG that experience a failure cannot perform a restart or other recovery mechanism without adversely impacting the user's experience (i.e. a disruption to the user's viewing occurs).

Reference is now made to FIG. 1b (prior art), which shows an existing method for restarting an OITF 102. Following a control session failure 116, software fault, or other type of failure, the OITF 102 performs a restart 118. All user and session data is cleared from the OITF 102, and the session state is lost 120, even though a content delivery session may still be active between the OITF 102 and the content source 108. In order to re-establish a control session, the content delivery session must also be terminated and restarted, as the delivery session is managed by (i.e. initiated, modified, terminated) and associated with the control session. As such, restarting an OITF is equivalent to a full power off-power on condition.

Accordingly, it should be readily appreciated that in order to overcome the deficiencies and shortcomings of the existing solutions, it would be advantageous to have a solution for gracefully recovering from errors and failures without impacting the user.

SUMMARY

It is an object of the present invention to obviate or mitigate at least one disadvantage of the prior art.

In a first aspect of the present invention, there is provided a method for restoring a session state by an Open IPTV Terminal Function (OITF) node following a control session failure. The method comprises the steps of sending a message to an external node participating in the control session, the message including a media activity indicator; responsive to sending the message including the media activity indicator, receiving from the external node at least one of a user identity registration information and a session information; and restoring the session state using at least one of the user identity registration information and the session information received from the external node. The at least one participating external node can be an IMS Gateway (IG). The message sent by the OITF can be an HTTP POST message or a SIP SUBSCRIBE message.

In an embodiment of the first aspect of the present invention, prior to the step of sending the message, the OITF can set the media activity indicator in accordance with a media activity state of the OITF. The media activity state can be determined in accordance with receipt of content by the OITF. Optionally, the method can include restarting a control plane of the OITF, prior to the step of sending a message. Restoring the session state can include restoring the user registration information and the session information to their state prior to the control session failure.

In a second aspect of the present invention there is provided a method for restoring a session state by an IG node following a control session failure. The method comprises the steps of receiving a message from an OITF node, the message including a media activity indicator; detecting a media activity state for the OITF in accordance with the media activity indicator; and sending at least one of a user identity registration information and a session information to the OITF. Optionally, in accordance with detecting the media activity state as not active, the IG can clear session information associated and de-register user identity registration information associated with the OITF.

In an embodiment of the second aspect of the present invention, the received message can further include a device identifier associated with the OITF. The user registration information and the session information can be associated with the device identifier. The method can further include the step of comparing the received device identifier to a device identifier stored in the IG.

In a third aspect of the present invention there is provided an OITF for use in an IPTV network, comprising a processor; a communication interface, operationally connected to the processor; an instruction repository storing instructions that when executed by the processor cause the processor to instruct the communication interface to send a message, including a media activity indicator, to at least one external node participating in a control session; the communication interface receives, from the at least one participating external node, at least one of a user identity registration information and a session information; and the processor uses at least one of the received user identity registration information and the received session information to create a session state.

In a fourth aspect of the present invention there is provided an IG for use in an IPTV network, comprising a processor; a memory storing at least one of a user identity registration information and a session information; a communication interface, operationally connected to the processor; the communication interface receives a message, including a media activity indictor, sent from an OITF; the processor detects a media activity state for the OITF in accordance with the media activity indicator; the processor retrieves from the memory, the at least one of the user identity registration information and the session information; and the processor instructs the communication interface to send the at least one of the user identity registration information and the session information to the OITF.

One skilled in the art will appreciate that failure and recovery of an OITF can occur without the user experiencing a disruption to their viewing so long as the recovery is performed quickly, and in the course of the recovery, the OITF does not force the IG or any other node to suspend the displaying of the content stream.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 illustrates an OITF and an IG of an embodiment of the present invention.

DETAILED DESCRIPTION

Figure 1A:
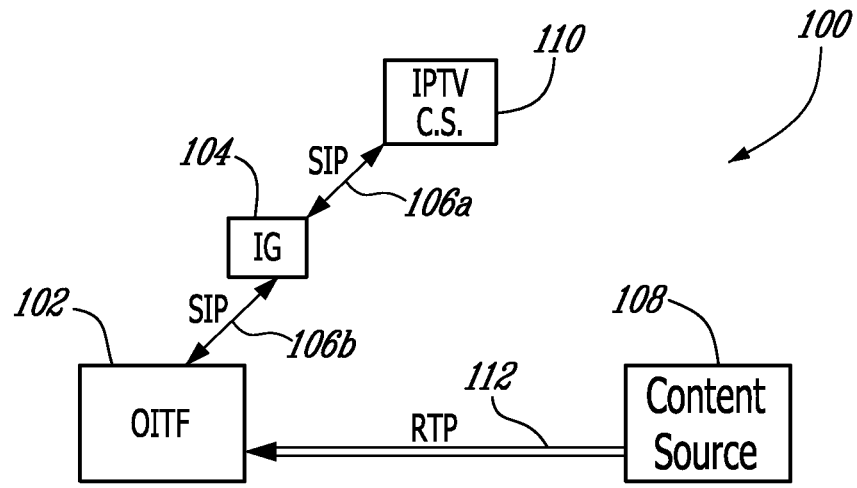
FIG. 1a illustrates a prior art IPTV network.
Figure 1B:
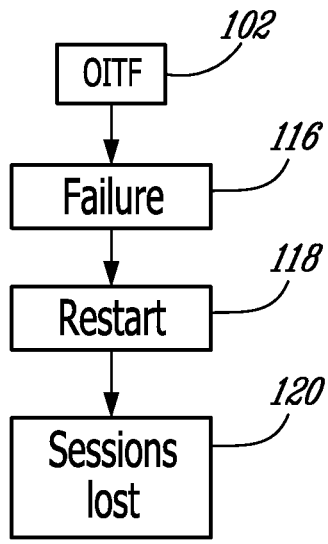
FIG. 1b illustrates a prior art method for restarting an OITF.

The innovative teachings of the present invention will be described with particular reference to various exemplary embodiments. However, it should be understood that these embodiments provide only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several figures.

The present invention is generally directed to a system and method for nodes to gracefully recover from failures in an IPTV network. Below are presented several different options for recovery of an OITF.

From the perspective of the OITF, control session data traverses to and from the IG, while the actual content used to provide video and audio to the user is delivered from the content source to the OITF through a different path. When a failure occurs on the control plane but content is still arriving, a graceful recovery process for the OITF which does not require the termination of the associated content delivery session(s) would allow for a seamless recovery of the control session state that is transparent to the user and does not cause interruption of the service.

Figure 2:
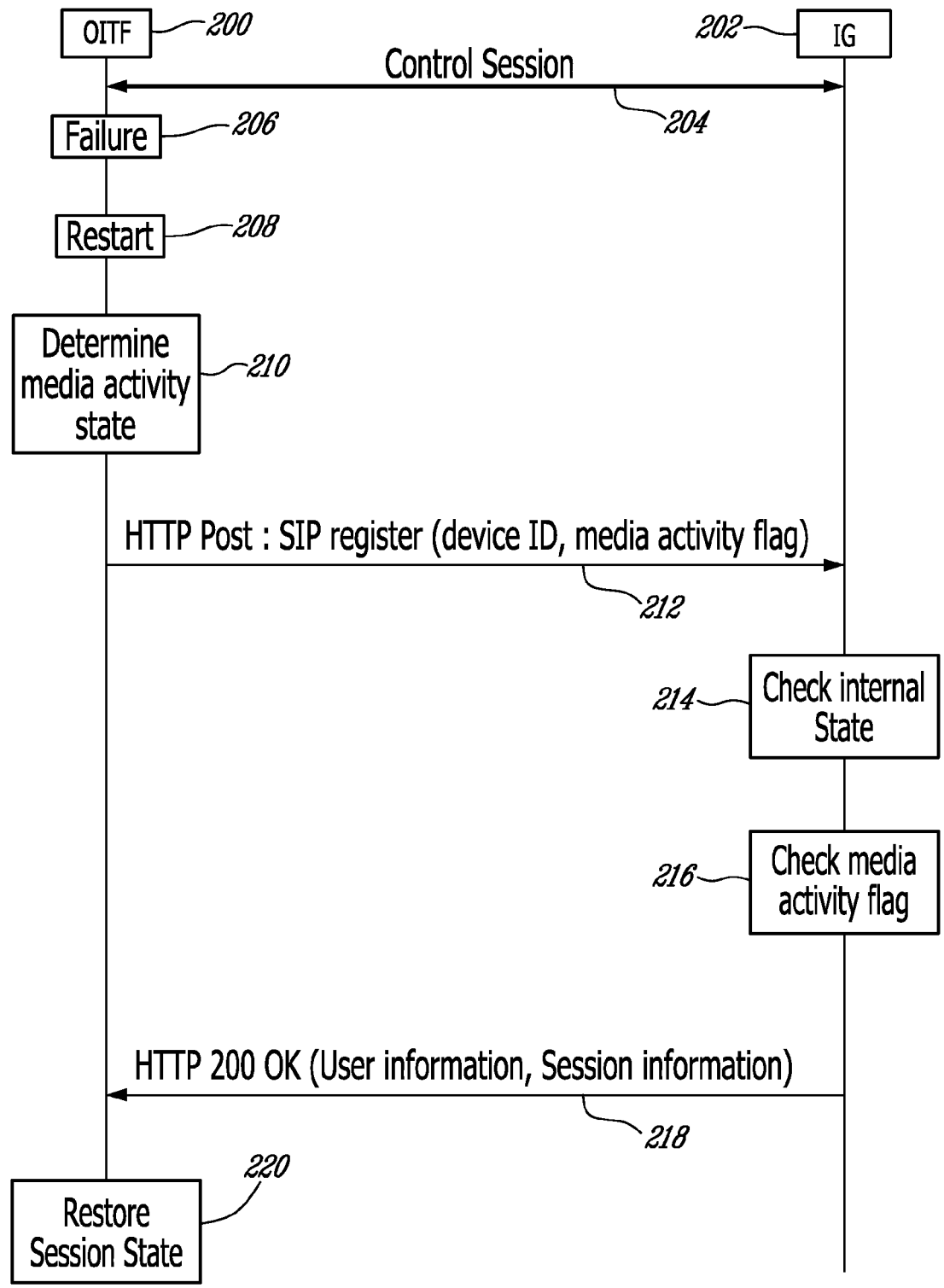
FIG. 2 is a signal flow illustrating a recovery process for an OITF.

FIG. 2 illustrates a signal flow for an exemplary recovery process for an OITF 200 of the present invention. The OITF 200 and the IG 202 are engaged in a control session 204, associated with an ongoing content delivery session (not shown). When the OITF 200 experiences a control plane failure 206, and restarts 208, it completes its start-up procedure without tearing down any of the established content delivery sessions prior to the restart 208.

In a preferred embodiment, the OITF 200 can perform a control plane restart without requiring a full power off-power on condition, and without affecting any of the other functions of the OITF 200.

As part of its restart procedure, the OITF 200 retrieves all user identities, also known as IMS Multimedia Public Identities (IMPUs), for the household subscription. This information may be cached in the OITF 200, or it can be retrieved from another node in the IPTV network, such as the IG 202 or the IPTV CS (not shown).

Also as part of its restart procedure, the OITF 200 broadcasts a server discovery request message and an IP address request message. These messages can take the form of DHCP messages (DHCPDISCOVER and DHCPREQUEST). The messages are received by the Wide Area Network Gateway (WANGW), which will assign the same IP address as prior to the restart to the OITF 200.

Optionally, in the case where the WANGW is integrated into the IG 202, the IG 202 has access to the DCHP information exchanged between the OITF 200 and the WANGW. The IG 202 can detect that the OITF 200 has restarted based on the receipt of the server discovery request and IP address request messages.

In step 210 the OITF 200 determines the state of its media activity, i.e. if the content delivery session has also experienced a failure or if the content delivery session has remained in tact and media continues to be rendered by the OITF. If the content delivery session has not been disrupted, and content continues to be received by the OITF, the media activity state is determined to be active. If the content delivery session has been disrupted, the media activity state is determined to be not active. A media activity indicator or flag can be included in messages sent from the OITF 200 to inform the other external nodes in the IPTV network of the status of the media activity in the OITF 200.

The media activity indicator can be implemented as a simple flag or as a multi-valued indicator included in a message. The media activity indicator can be set in accordance with the media activity state. The media activity indicator can indicate whether the OITF is receiving content or not, or alternatively, indicate other status information about the OITF.

Continuing its start-up procedure, the OITF 200 sends a SIP register message 212 to the IG 202, which includes the device identifier (deviceID) of OITF 200 and the media activity flag. For exemplary purposes, SIP register message 212 is shown as an HTTP POST message. However, it can also take the form of a SIP SUBSCRIBE message. It will be apparent to one skilled in the art that any other appropriate protocol or language can be used to convey the information. The IG 202 optionally checks its internal state in step 214 to see if it holds a state for the deviceID included in the message 212. The received deviceID can be compared to any deviceIDs with associated information already stored in the IG 202. If the deviceID matches a deviceID whose state is already present in the IG 202, the IG 202 can conclude that the OITF 200 has undergone a restart, as opposed to powering on for the first time, where the IG 202 would not hold a state for the deviceID. If the OITF 200 has restarted, the IG 202 then checks the media activity flag included in the message 212, in step 216. The media activity state of OITF 200 can be detected from the media activity flag. If the media activity flag is active, this indicates that the media was not disrupted and a content delivery session is ongoing. The IG 202 returns to the OITF 200 the user registration information (all registered IMPUs) and all related session information associated with the deviceID of OITF in HTTP 200 OK message 218. Again, other protocols or languages can be used to convey this information. The session information can include the session identity, the called party, and other information pertinent to the SIP session the user is engaged in.

The OITF 200 is then able to create a complete state using the received user registration information and session information in step 220. Creating the control session state includes restoring all information lost during the restart (i.e. the user registration and session information) to its state prior to the failure and restart.

If the media activity flag is absent or is determined to be not active in step 216, this indicates that the media has been disrupted and the media activity state of OITF 200 is not active. The IG 202 then clears all session information and de-registers all IMPUs it holds associated with the deviceID of OITF 200. In this case, the IG 202 may not return any information to the OITF 200.

In an alternative embodiment, the OITF 200 can contact another node in the IPTV network which is participating in the control session 204, or an associated control session (not shown), as part of its restart procedure. For the example, OITF 200 can send a message, including the media activity flag, to an IPTV CS and receive user registration and session information in return, if the media activity state is determined to be active.

FIG. 3 illustrates a block diagram embodiment of an OITF 200 and an IG 202 of the present invention. The OITF 200 includes a processor 302 which controls and interacts with a communication interface 306, and an instruction repository 304 which stores instructions to be executed by the processor 302. Similarly, the IG 202 includes a processor 312 which controls and interacts with a communication interface 316, and a memory 314 which stores information to be retrieved and used by the processor 312. The communication interfaces 306 and 316 can send and receive HTTP messages and/or SIP messages to be acted upon by their associated processors 302 and 312. The OITF 200 and IG 202 can implement any of the methods of the present invention as illustrated in FIG. 2 and described herein.

Following a control plane restart, the OITF processor 302 determines its media activity state using information from the communication interface 306. The processor 302 can continually monitor the receipt of content data via the communication interface 306 and thus determine the state of media activity as active or not active. The processor 302 instructs the communication interface 306 to send a message including a device identifier and a media activity indicator to an external node participating in a control session. The media activity indicator is set in accordance with the media activity state. The external node participating in the control session may be the IG 202, or another node in the IPTV network.

For exemplary purposes, the message is received by the communication interface 316 of the IG 202. The processor 312 can determine if the IG 202 already holds a state for OITF 200 by comparing the received device identifier to the device identifier(s) with associated information stored in its internal memory 314. The processor 312 also determines if the media activity indicator of the received message is active or not active. The media activity state of OITF 200 can be detected in accordance with the media activity indicator. If the media activity indicator is active, the processor 312 retrieves all user identity registration information and session information associated with the received device identifier from the memory 314. The processor 312 then instructs the communication interface 316 to send a reply message to the OITF 200, the message including the retrieved user identity registration information and session information.

The OITF communication interface 306 receives the user identity registration information and session information. The processor 302 then uses the received user identity registration information and the received session information to create, or restore, a session state.

One skilled in the art will appreciate that in implementation, the functions of the processors 302 and 312 can be provided by general purpose processors, or task specific processors, that can execute instructions stored in the instruction repository 304 or memory 314 to enable the above described functionality. The communication interfaces 306 and 316 can be implemented through a single network connection, or multiple network connections using standard network interfaces and being controlled by the associated processors 302 and 312.

Based upon the foregoing, it should now be apparent to those of ordinary skill in the art that the present invention provides an advantageous solution. Although the system and method of the present invention have been described with particular reference to certain type of messages and nodes, it should be realized upon reference hereto that the innovative teachings contained herein are not necessarily limited thereto and may be implemented advantageously in various manners. It is believed that the operation and construction of the present invention will be apparent from the foregoing description.

Embodiments of the invention may be represented as a software product stored in a machine-readable medium (also referred to as a computer-readable medium, a processor-readable medium, or a computer-usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those skilled in the art without departing from the scope of the invention, which is defined solely by the claims appended hereto.

What is claimed is:

1. A method for restoring a control session state by an Open IPTV Terminal Function (OITF) node following a control session failure, comprising:
    sending a message, including a media activity indicator, to an external node participating in the failed control session, the media activity indicator indicating that a content delivery session, associated with the failed control session, remains active following the control session failure;
    receiving from the external node at least one of a user identity registration information and a session information, in response to sending the message; and
    restoring the control session state to its state prior to the control session failure using the at least one of the user identity registration information and the session information received from the external node, without terminating the associated content delivery session.

2. The method of claim 1, wherein the at least one participating external node is an IMS Gateway (IG).

3. The method of claim 1, wherein the step of sending the message includes sending at least one of an HTTP POST message and a SIP SUBSCRIBE message.

4. The method of claim 1, further comprising, prior to the step of sending the message, the step of setting the media activity indicator in accordance with a media activity state of the OITF.

5. The method of claim 4, wherein the media activity state is determined in accordance with receipt of content by the OITF.

6. The method of claim 1, further comprising the step of restarting a control plane of the OITF, prior to the step of sending a message.

7. The method of claim 1, wherein the step of restoring the control session state includes restoring the user registration information and the session information to their states prior to the control session failure.

8. A method for restoring a control session state by an IMS Gateway (IG) node following a control session failure, comprising:
    receiving a message from an Open IPTV Terminal Function (OITF) node, the message including a media activity indicator indicating a media activity state of a content delivery session associated with the failed control session; and
    sending at least one of a user identity registration information and a session information to the OITF in response to detecting the media activity state as active for the OITF in accordance with the received media activity indicator.

9. The method of claim 8, wherein, in response to detecting the media activity state as not active, clearing a session information associated with the OITF at the IG; and de-registering a user identity registration information associated with the OITF.

10. The method of claim 8, wherein the received message further includes a device identifier associated with the OITF.

11. The method of claim 10, wherein the at least one of the user identity registration information and the session information is associated with the device identifier.

12. The method of claim 10, further comprising the step of comparing the received device identifier to a device identifier stored in the IG.

13. An Open IPTV Terminal Function (OITF) for use in an IPTV network, comprising:
    a processor;
    a communication interface, operationally connected to the processor;
    an instruction repository storing instructions that when executed by the processor cause the processor to instruct the communication interface to:
        send a message to an external node participating in a failed control session;
        the message includes a media activity indicator indicating that a content delivery session, associated with the failed control session, remains active following a control session failure;
    the communication interface receives, from the external node, at least one of a user identity registration information and a session information; and
    the processor uses the at least one of the received user identity registration information and session information to restore a control session state to its state prior to the control session failure, without terminating the associated content delivery session.

14. The OITF of claim 13, wherein prior to sending the message, the processor sets the media activity indicator in accordance with a media activity state of the OITF.

15. The OITF of claim 14, wherein the processor determines the media activity state in accordance with receipt of content by the communication interface.

16. The OITF of claim 13, wherein the at least one external node participating in a control session is an IMS Gateway (IG).

17. The OITF of claim 13, wherein the communication interface sends at least one of an HTTP POST message and a SIP SUBSCRIBE message.

18. The OITF of claim 13, wherein prior to sending the message, the OITF performs a control plane restart.

19. An IMS Gateway (IG) for use in an IPTV network, comprising:

a processor;

a memory storing at least one of a user identity registration information and a session information;

a communication interface, operationally connected to the processor; the communication interface:

receives a message sent from an Open IPTV Terminal Function (OITF);

the message includes a media activity indicator indicating a media activity state of a content delivery session associated with a failed control session;

the processor detects a media activity state as active for the OITF in accordance with the media activity indicator;

the processor retrieves from the memory, the at least one of the user identity registration information and the session information; and the processor instructs the communication interface to send the at least one of the user identity registration information and the session information to the OITF.

20. The IG of claim 19, wherein the received message further includes a device identifier.

21. The IG of claim 20, wherein the at least one of the user identity registration information and the session information is retrieved in accordance with the device identifier.

22. The IG of claim 20, wherein the received device identifier is compared to a device identifier stored in the memory.

23. The IG of claim 19, wherein the processor instructs the memory to clear at least one of a user identity registration information and a session information associated with the OITF from the memory, in accordance with detecting the media activity state as not active.

24. The method of claim 8, wherein the at least one of the user identity registration information and the session information is to be used by the OITF to restore the control session state without terminating the associated content delivery session.

25. The IG of claim 20, wherein the at least one of the user identity registration information and the session information is to be used by the OITF to restore the control session state without terminating the associated content delivery session.

* * * * *